United States Patent [19]

Scholz

[11] 4,212,187
[45] Jul. 15, 1980

[54] METHOD AND APPARATUS FOR RESIZING TORQUE CONVERTER IMPELLER DRIVE SHAFTS

[76] Inventor: Oscar P. Scholz, 70 Laconia Ct., San Jose, Calif. 95139

[21] Appl. No.: 963,341

[22] Filed: Nov. 24, 1978

[51] Int. Cl.² .......................................... B21D 39/08
[52] U.S. Cl. ...................................... 72/393; 72/340; 29/402.21
[58] Field of Search ............... 29/401 R, 406, 402.01, 29/402.19, 402.21; 72/340, 370, 392, 393

[56] References Cited

U.S. PATENT DOCUMENTS

| | | | |
|---|---|---|---|
| 1,680,650 | 8/1928 | Travis | 72/392 |
| 1,722,389 | 7/1929 | Opie et al. | 29/401 R |

FOREIGN PATENT DOCUMENTS 1078646  8/1967  United Kingdom .................... 72/393

*Primary Examiner*—Lowell A. Larson
*Attorney, Agent, or Firm*—Jack M. Wiseman

[57] ABSTRACT

A method and apparatus for resizing torque converter impeller drive shafts. The method comprises the steps of heating the hollow drive shaft to a malleable state, radially expanding the drive shaft to a dimension larger than its original diameter, and grinding and polishing the outside of the drive shaft to its original size. The apparatus comprises a power drive tool for radially expanding a worn drive shaft to a diameter larger than its original diameter.

3 Claims, 6 Drawing Figures

METHOD AND APPARATUS FOR RESIZING TORQUE CONVERTER IMPELLER DRIVE SHAFTS

BACKGROUND OF THE INVENTION

Automatic transmissions of the type employed in family automobiles, light trucks, and even heavy trucks, such as tractors for highway trailers, commonly employ a mechanical gear train with a hydraulic connector on the input side of said transmission. The hydraulic connector usually comprises a mechanism not unlike a pair of fans facing each other wherein one fan is driven and the other rotates from the current of air from the driven fan. Thus, a coupling of this kind comprises two rotating parts fitted with radially extending vanes, one of which is the driving member or impeller, and the other of which is the driven member or turbine. As assembled, the impeller and turbine define a torus wherein hydraulic oil flung by the engine-connected impeller drives the turbine and its associated mechanical gear train.

When repair or overhaul is indicated for an automatic transmission of this type, it is often found that the drive shaft or hub of the impeller is worn to the extent that it must be replaced. Since the drive shaft is integral with the impeller, it has heretofore been necessary to either replace the impeller assembly with a new one, or remove the tubular hollow drive shaft of the freed impeller and replace it in the impeller assembly.

Neither case provides an economical repair. In one case, the welded bond between the drive shaft and the impeller must be cut away and a new drive shaft welded into the assembly after painstakingly aligning the drive shaft and impeller to preserve concentricity. As a practical matter, it is almost always true that concentricity must be corrected after a new drive shaft hub is installed. In the other case, replacement of the entire impeller assembly is relatively expensive.

It was previously known that a method and apparatus for repairing worn torque converter impeller drive shafts employed the steps of separating the impeller from the transmission assembly, separating the drive shaft from the impeller, installing by welding a new drive shaft with the old impeller, and then realigning the assembly of the new drive shaft with the old impeller.

In the U.S. Pat. to J. A. Ferris, Sr., No. 3,541,665, issued on Nov. 24, 1970, there is disclosed a method and apparatus for resizing the collapsed core which is usually of very heavy laminated paper construction of a roll or coil of material. The method and apparatus disclosed in the patent to Ferris provides a power-driven, bullet-shaped die which is thrust into the deformed core aperture to radially expand the core to its original circular cross-section.

The U.S. Pat. to Powell et al., No. 3,557,435, issued on Jan. 26, 1971, discloses a Method For Repairing Bungholes, in which a weld ring aroung the bunghole is removed, the void is cleaned out, and the groove filled with new weld metal. Another patent of interest is the U.S. Pat. to Grant, No. 3,237,292, granted on Mar. 1, 1966, for Method And Means For Resizing Pistons And Like Hollow Articles.

Techniques which were well known in forging and blacksmithing used a hole in a metal workpiece. The workpiece was heated to a malleable state and enlarged by forcing successively larger diameter dies through the workpiece. Thus, a malleable tubular workpiece may be radially expanded by forcing a bullet-shaped die therethrough, and a thick-wall workpiece of the same type may be heated to a malleable state before forcing the die through the workpiece. The well-known collet chuck has flexible fingers arranged to be cammed inward to grip a cylindrical workpiece.

SUMMARY OF THE INVENTION

A method and apparatus for resizing the hollow drive shaft or hub of a torque converter impeller in situ wherein an articulated cylindrical expansion tool has a circumferential array of flexible longitudinal fingers. The collective inner walls of the longitudinal fingers form a downwardly tapered bore for receiving a complementary tapered die. The die is power driven downward into the bore whereby the flexible fingers move uniformly radially outward. Thus, when the expansion tool is confined in the bore of a hollow drive shaft, the drive shaft is diametrically expanded and can be subsequently ground and finished to its original dimensions.

DESCRIPTION OF THE PREFERRED EMBODIMENT

Figure 1:
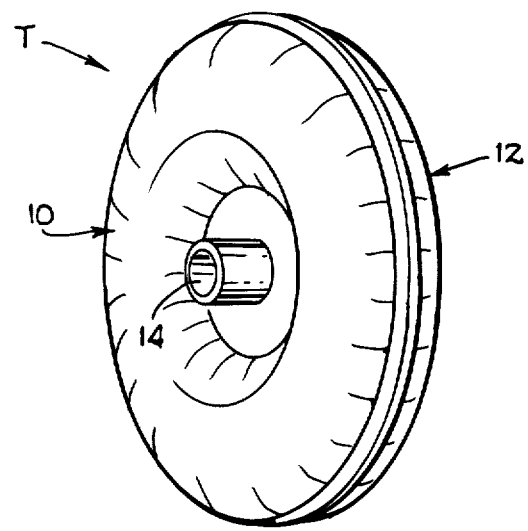
FIG. 1 is a perspective view of a torque converter assembly, as seen from the impeller and drive shaft side.

A typical torque converter assembly T (FIG. 1) is formed of an impeller housing 10 and a turbine housing 12 which cooperatively form a torus. The impeller housing 10 includes an integral tubular drive shaft or hub 14, which is driven by means, not shown, and which conducts hydraulic fluid into the torque converter assembly T. In order to rotatively support the impeller and to also prevent leakage of the hydraulic fluid, the exterior surfaces of the hub 14 are precisely dimensioned and finished to have a precision fit within a sealed bearing, not shown. In operation, vanes 16 (FIG. 2) within the driven impeller cause the hydraulic oil in the torque converter assembly T to produce a corresponding rotation of the similarly constructed turbine 12.

After extended service, the hub 14 may become scored, or worn to a reduced size, or both. This directly and adversely affects the aforementioned seal between the hub 14 and its bearing, and requires that the hub 14 be either reconditioned or replaced. Preconditioning of the hub was not generally practiced, and the only repair short of replacing the entire impeller 10, which is a relatively expensive item, included removing the integral hub by heating the weld between the housing and hub. A new hub was then welded to the housing and axial misalignment of the hub and housing required truing of the assembly on a lathe while the new hub was honed and polished. Needless to say, this overall procedure including the cost of removing the old hub, the cost of the new hub, the welding and machining costs, and the honing and polishing costs resulted in an expensive repair.

The present invention provides means for reconditioning the worn hub of a torque converter impeller while the hub remains attached to the impeller housing. After separating the impeller housing 10 from the torque converter assembly T (FIG. 1), the impeller is preferably placed upon a turntable 18 which is provided with a drive peg 20 to positively engage a vane 16. The turntable is then slowly rotated while a flame from a heating torch 22 is directed onto the hub 14. When the hub 14 has attained a red heat, or in other words is more malleable than when cold, the impeller is placed on the bed 24 (FIG. 3) of a hydraulic press P.

The press P (diagrammatically illustrated herein) includes an inverted U-shape beam 26 having a central bearing 28 in which a vertically movable die holder 30 is slidably mounted. A downwardly narrowing tapered circular die 32 is mounted in the die holder 30, the latter being attached to a shaft 34 which is actuated by a hydraulic ram, not shown.

Figure 3:
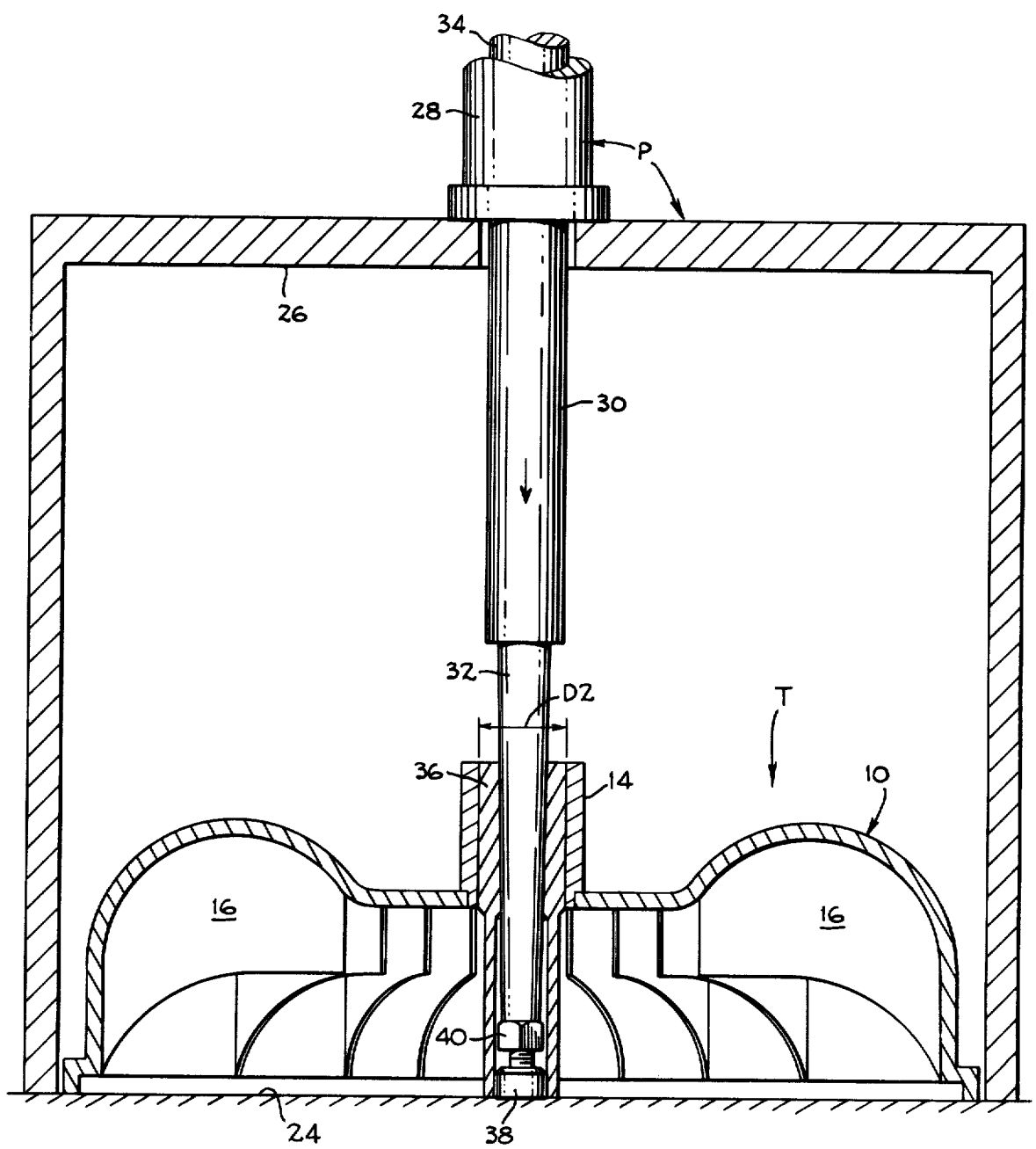
FIG. 3 is a further enlarged diagrammatic vertical section view of the impeller shown in FIG. 2, and includes a rigid support for resisting the downward thrust of an expansion tool located in the hollow drive shaft or hub of the impeller.

Before the ram is actuated to place the die 32 in its lowermost position shown in FIG. 3, and while the hub 14 is malleable, an expansion tool 36 is placed inside the hub 14 and over a locating stud 38. Extending upward through the stud 38 is an adjustable stop bolt 40 which is arranged to limit the downward movement of the die 32. It will be understood that either the clearance between the impeller housing 10 and the inside of the beam 26 is such as to center the impeller housing 10 relative to the locating stud 38 and the die 32, or that adjustable stops, not shown, may accomplish the same purpose.

Figure 5:
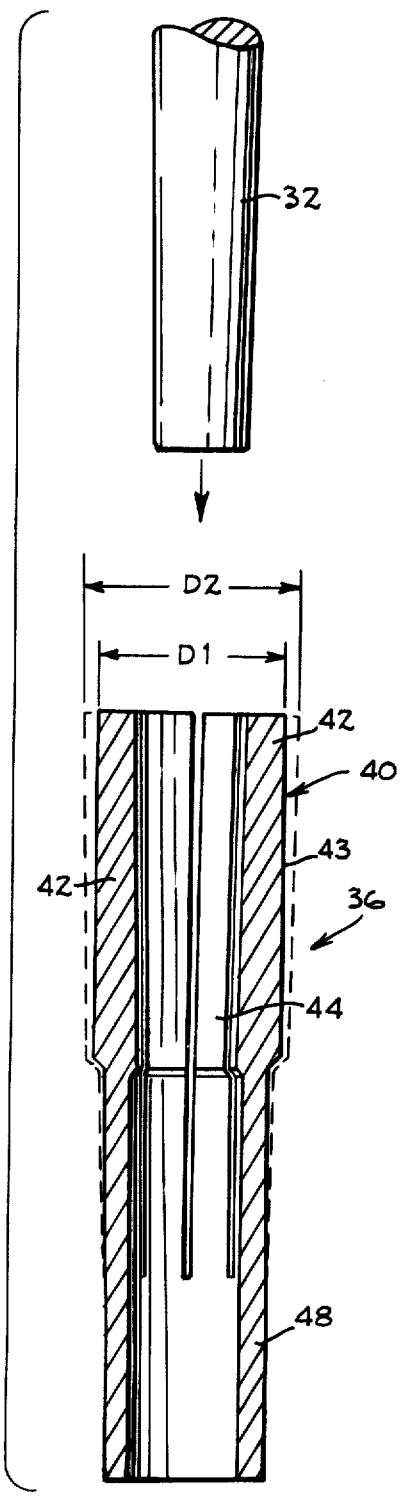
FIG. 5 is an axial section of the expansion tool shown in FIG. 4 and includes an overhead die which upon descending causes radial expansion of the tool.
Figure 6:
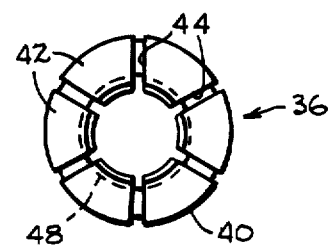
FIG. 6 is a top plan view of the tool shown in FIG. 5.
Figure 4:
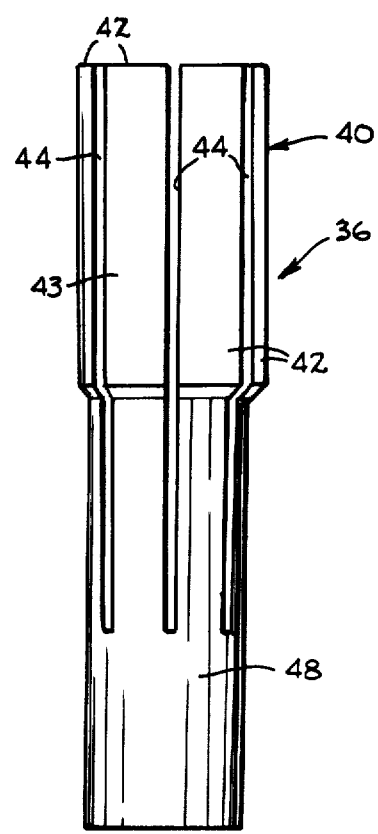
FIG. 4 is an enlarged elevation view of the expansion tool shown in FIG. 3.

FIGS. 4-6 disclose the expansion tool 36 in detail. The upper end portion of the tool comprises a female die section 40 which is exteriorly cylindrical and interiorly tapered. More specifically, the upper end portion is formed of a circumferential array of equally spaced fingers 42 (FIG. 6) which are separated by longitudinal kerfs 44. In a free condition, the outer walls of the fingers 42 collectively delineate a cylindrical surface 43 having a diameter D1 (FIG. 5). The inner walls of the fingers 42 define a downwardly narrowing tapered bore, coextensive with the outer cylindrical surface 43, that has precisely the same taper as the taper of the male die 32. Fingers 42 extend downward into a cylindrical base portion 48 having inside and outside diameters respectively larger and smaller than the inside and outside diameters of the die section 40 in order to clear the die and to allow free insertion of the tool 36 in the hub 14.

The dimensions of the die 32 and the tapered bore 44 are such that when the die 32 (FIG. 3) is seated against the stop bolt 40, the outside diameter of the female die section 40 increases to the diameter D2 (FIG. 5). Because the lower end portions of the fingers 42 (FIGS. 4 and 5) extend a substantial distance into the relatively thin wall base 48 and are quite flexible in that area, and because the unworn interior of the hub 14 (FIG. 3) is cylindrical and has coextensive contact with the upper portions of the fingers when the die 32 moves downward into the expansion tool 40, the cylindrical surface 43 (FIG. 4) formed by the collective exterior surfaces of the fingers 42 is uniformly radially expanded.

The inside diameter of the hub 14 may be, for a widely used torque converter, two inches. Thus, the diameter D1 (FIG. 5) allows a sliding fit into the hub, and when the fingers 42 are moved radially outward, the diameter D2 may be about fifty-thousandths (0.050) of an inch larger. Accordingly, the red hot, malleable hub 14 in FIG. 3 is expanded to an oversize dimension which is sufficient to subsequently permit grinding and polishing operations, which restore the exterior surfaces of the hub to the original tolerances.

Figure 2:
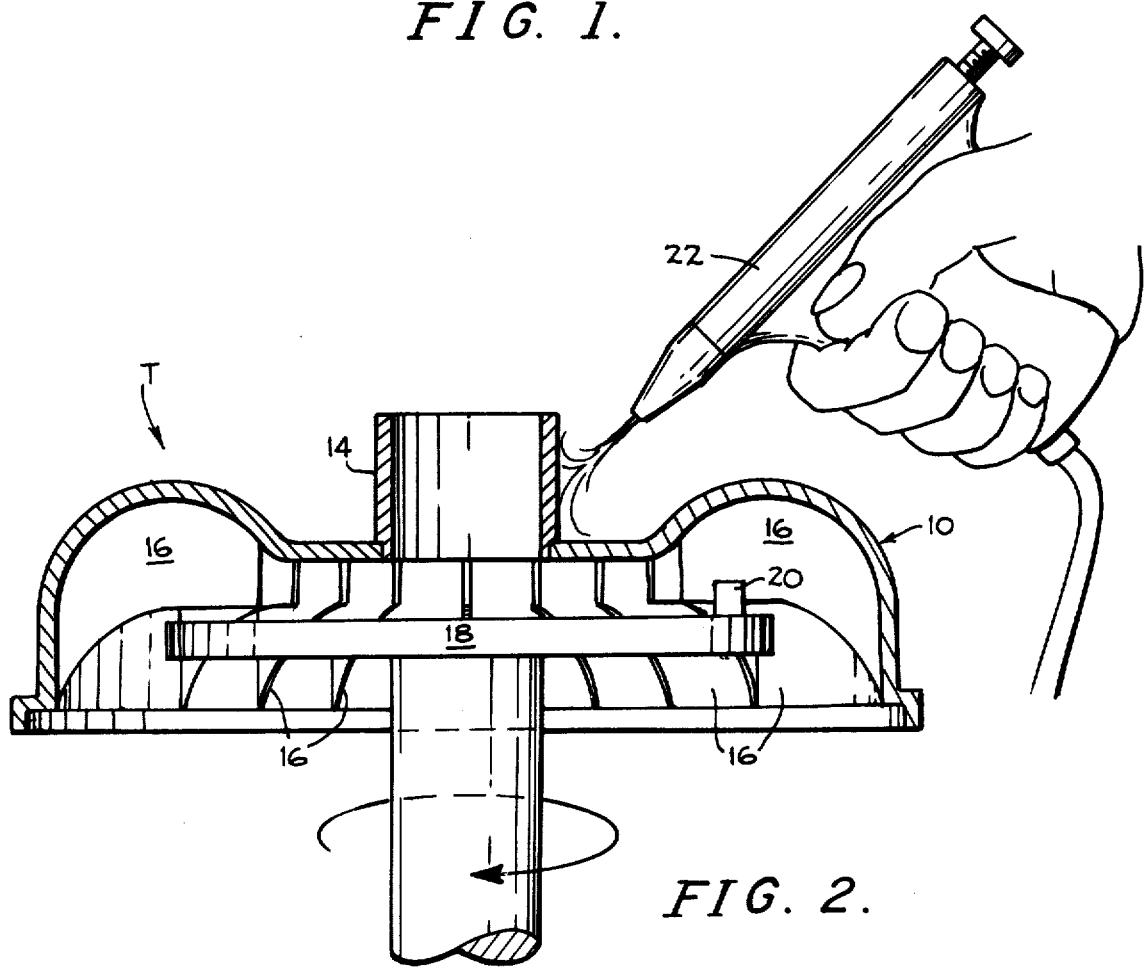
FIG. 2 is an enlarged vertical section of a torque converter impeller shown in FIG. 1 mounted on a turntable.

To summarize the method steps of the present invention, the impeller housing 10 (FIG. 2) is preferably placed on a revolving turntable 18 to uniformly spread the heat from a torch applied to the driving hub 14 and the hub 14 is heated red hot. The impeller housing 10 is then mounted in a hydraulic press P as shown in FIG. 2 and the expansion tool 40 is mounted in the hub 14 and radially expanded by the die 32 to uniformly radially expand the fingers 42, and, hence, the encircling hub 14, to an outside diameter which will subsequently allow sufficient material to be removed to restore the hub to its original size. The final step is the grinding and polishing of the hub 14 while correcting and/or preserving the concentricity of the hub 14 relative to the impeller housing 10.

I claim:

1. A method of resizing the hollow drive shaft hub of a torque converter impeller comprising the steps of:
   (a) uniformly heating said hub to a malleable state;
   (b) rotating said impeller during said step of uniformly heating said hub to a malleable state;
   (c) positioning an expanding tool within said heated and malleable hollow hub;
   (d) actuating said expanding tool to radially expand said hub, while malleable, to a diameter larger than its original diameter, the rotation of said impeller during the uniform heating of said hub to a malleable state enables the actuation of said expanding tool to provide a uniform expansion of said hub; and
   (e) finishing the exterior of said hub to fit a complementary bearing therefor.

2. A method as claimed in claim 1 and further comprising the step of positioning said impeller on a support bed in a downwardly opened manner after the heating of said hollow hub to a malleable state and before the positioning of the expanding tool within the heated and malleable hollow hub.

3. Apparatus for increasing the outside diameter of a hollow drive shaft hub of a torque converter impeller so that the hub may be refinished to prescribed dimensional tolerances comprising:
   (a) a support bed for supporting a downwardly open torque converter impeller having a hollow drive shaft hub;
   (b) an elongated cylindrical sleeve including one portion having a predetermined outside diameter, the inner wall of said sleeve defining a downwardly narrowing tapered bore, said sleeve being removably disposed in the drive shaft hub of said torque converter impeller;
   (c) means defining circumferentially spaced longitudinal kerfs extending through the wall of said sleeve to provide laterally flexible fingers in said one portion;

(d) a tapered die having an exterior surface complementary to said inner bore of said cylindrical sleeve and axially movable along the inner bore of said sleeve;

(e) power means carrying said tapered die for downward powered movement into said sleeve for uniformly radially expanding said laterally flexible fingers, the outside diameter of said sleeve uniformly expanding when engaging the surrounding inside surface of the drive shaft hub of said torque converter impeller; and (f) adjustable stop means on said support bed in axial alignment with the hollow drive shaft hub of said impeller and coaxial with said die for stopping said die at a predetermined elevation in order to limit the radial expansion of said sleeve.

* * * * *